United States Patent [19]

Miyazaki et al.

[11] 4,206,442
[45] Jun. 3, 1980

[54] LETTER SEGMENTING APPARATUS FOR OCR COMPRISING MULTI-LEVEL SEGMENTOR OPERABLE WHEN BINARY SEGMENTING FAILS

[75] Inventors: Toshio Miyazaki; Yukio Hoshino, both of Tokyo, Japan

[73] Assignee: Nippon Electric Co., Ltd., Tokyo, Japan

[21] Appl. No.: 17,668

[22] Filed: Mar. 5, 1979

Related U.S. Application Data

[63] Continuation-in-part of Ser. No. 909,429, May 25, 1978, abandoned, which is a continuation of Ser. No. 837,324, Sep. 27, 1977, abandoned, which is a continuation of Ser. No. 780,199, Mar. 22, 1977, abandoned, which is a continuation of Ser. No. 717,435, Aug. 24, 1976, abandoned, which is a continuation of Ser. No. 593,133, Jul. 3, 1975, abandoned.

[30] Foreign Application Priority Data

Jul. 3, 1974 [JP] Japan ................. 49-75985

[51] Int. Cl.$^2$ ............................................ G06K 9/00
[52] U.S. Cl. ...................... 340/146.3; 340/146.3 SG
[58] Field of Search ............. 340/146.3 H, 146.3 SG

[56] References Cited

U.S. PATENT DOCUMENTS

| | | |
|---|---|---|
| 3,164,806 | 1/1965 | Rabinow ................ 340/146.3 SG |
| 3,219,974 | 11/1965 | Rabinow ................ 340/146.3 SG |
| 3,295,105 | 12/1966 | Gray et al. ............. 340/146.3 H |
| 3,517,387 | 6/1970 | Andrews et al. ......... 340/146.3 SG |
| 3,662,341 | 5/1972 | Baumgartner et al. .... 340/146.3 SG |
| 3,930,228 | 12/1975 | Spanjersberg ........... 340/146.3 SG |

*Primary Examiner*—Leo H. Boudreau
*Attorney, Agent, or Firm*—Sughrue, Rothwell, Mion, Zinn and Macpeak

[57] ABSTRACT

A letter segmenting apparatus for the optical character recognition is disclosed. In response to a binary pattern of signals for a letter group, a proportioning circuit predicts possible locations of dividing lines between the letters. A binary signal processor processes the binary pattern to find correct dividing lines near the predicted locations. When this processor fails to find a correct dividing line, a multi-level signal processor finds the correct dividing line near the predicted location.

2 Claims, 8 Drawing Figures

FIG 7

LETTER SEGMENTING APPARATUS FOR OCR COMPRISING MULTI-LEVEL SEGMENTOR OPERABLE WHEN BINARY SEGMENTING FAILS

RELATED APPLICATION

The instant invention is a continuation-in-part application of the U.S. application of Miyazaki et al., Ser. No. 909,429, filed May 25, 1978, now abandoned, and in turn a continuation of Ser. No. 837,324, filed Sept. 27, 1977, now abandoned, and in turn a continuation of Ser. No. 780,199, filed Mar. 22, 1977, now abandoned, and in turn a continuation of Ser. No. 717,435, filed Aug. 24, 1976, now abandoned, and in turn a continuation of Ser. No. 593,133, filed July 3, 1975 now abandoned.

BACKGROUND OF THE INVENTION

This invention relates to a letter segmenting apparatus for use in automatic character recognition known generally by the name of "optical" character recognition. The word "letter" may refer to a numeral, a symbol, a mark, or the like.

On recognizing by an automatic character recognition system a group of substantially aligned letters, for example, a word in a sentence or a number, it is necessary to supply a letter recognition unit of the system with signals representative of each letter. It is, however, not easy to segment two adjacent letters or to decide a dividing line therebetween, particularly when these letters are touching or partially merging with each other. Under the circumstances, a feature extraction scheme appears to be effective in theory. The device therefor, however, is complicated and is not operable at a high speed.

SUMMARY OF THE INVENTION

It is therefore a principal object of the present invention to provide a letter segmenting apparatus capable of effectively segmenting letters in a letter group.

It is a subordinate object of this invention to provide a letter segmenting apparatus of the type described, which is relatively simple in structure.

It is another subordinate object of this invention to provide a letter segmenting apparatus of the type described, which is operable at a high speed.

On recognizing individual letters in a group of letters machine-printed or otherwise printed substantially along a line on a recording medium, it is known to subject the letter group to optical or other raster scanning so as to divide each letter area and its adjacent areas into a great number of elementary areas and so as to successively or otherwise produce signals representative of shades of light or other physical quantities of the respective elementary areas. These signals are usually quantized with reference to two quantization steps or levels into binary signals. This is also the case with this invention. Quantization with reference to more than two quantization steps, known per se, is additionally resorted in an accordance with this invention. Multi-level, or more-than-two-level, signals are thereby obtained. On the other hand, it is also known in the automatic character recognition art to define for a letter group a frame bounded by four straight line segments, a beginning, an end, a top, and a bottom line or boundary. As will readily be understood, a frame consists of letter areas and their adjacent areas. A group of binary signals and a group of multi-level signals for each frame are herein referred to as a binary and a multi-level pattern, respectively. In contrast to dividing lines, it is always possible according to prior art to find with reference to a series of binary patterns a beginning, an end, a top, and a bottom line for each frame, to measure of the frame width and height, or the spacings or distances between the beginning and end lines and between the top and bottom lines, in terms of the number of elementary areas, and to predict the approximate or possible number of letters in the group in consideration of the frame width and height. In case the letters being scanned are either of a predetermined font of a substantially fixed pitch (letter width) or enlarged or reduced in scale to have a substantially common height and width, the possible number of letters in a frame is predictable in consideration only of the frame width.

An apparatus according to this invention is now said to be for segmenting letters in a group of substantially aligned letters of a substantially common height and width. The apparatus comprises a binary pattern memory for storing therein a binary pattern of the letter group, a multi-level pattern memory for storing therein a multi-level pattern of the letter group, a frame decision circuit producing signals representative of the width of a frame for the letter group with reference to the binary pattern stored in the binary pattern memory, a proportioning circuit responsive to the frame width signals and in consideration of the common letter width for proportioning the frame width to produce signals representative of possible locations of dividing lines for the letters in the group, and a binary signal processor responsive to the possible location signals and the binary pattern stored in the binary pattern memory for successively deciding correct dividing lines in regions of the respective possible locations until the processor fails to decide a correct dividing line to produce, in each instance, signals representative of the correct dividing line and a control signal representative of whether or not the correct dividing line is decided. The apparatus further comprises a location adjusting circuit successively responsive to the correct dividing line signals and the frame width signals for improving the possible location signals and a multi-level signal processor, or multi-level "segmentor", responsive to the control signal representative of failure of the binary signal processor of deciding a correct dividing line, the possible location signals for the last-mentioned dividing line, and the multi-level pattern stored in the multi-level pattern memory for deciding the last-mentioned dividing line to produce signals representative of the last-mentioned dividing line.

When the binary signal processor fails to decide a correct dividing line at the beginning of its operation for a binary pattern, the order of the successive decision may be reversed. If it is still impossible for the binary signal processor to decide a correct dividing line, only the multi-level signal processor may operate, preferably in the above-mentioned reversed order of succession.

DETAILED DESCRIPTION OF PREFERRED EMBODIMENTS

At first, a letter segmenting apparatus according to a preferred embodiment of the present invention for a group of three letters of the type specified will be described hereunder with reference to the accompanying drawings.

Figure 1:
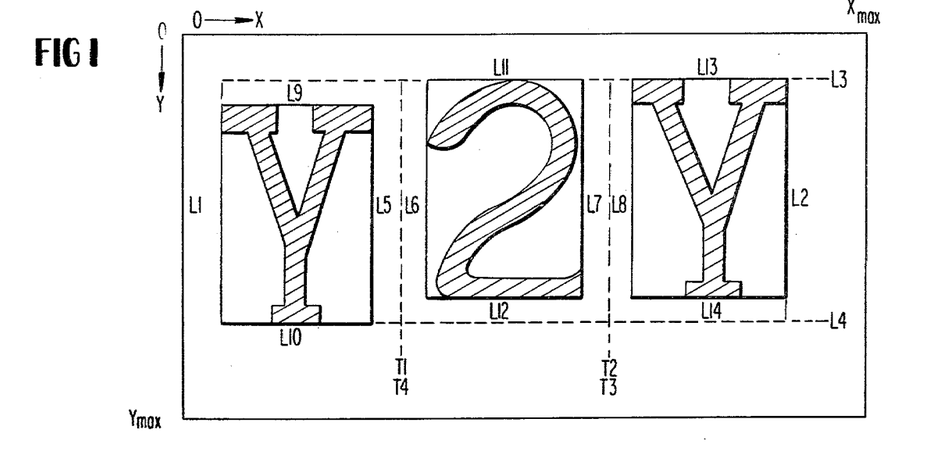
FIG. 1 illustrates an ideal group of three letters, together with a frame and two dividing lines, to be segmented by an apparatus according to the instant invention.

Referring to FIG. 1, a letter group consists of three substantially aligned letters "Y", "2", and "Y" of a substantially common letter width and height. As described, it is generally possible to define for such a letter group a frame bounded by a beginning line L1, an end line L2, and primary top and bottom lines L3 and L4. The letter group shown is ideal in that the letters are separable or "sectionable" by dividing lines T1 and T2. In this event, it is readily possible to define smaller or secondary frames for the respective letters, as by left and right lines L1 and L5, L6 and L7, and L8 and L2 and secondary top and bottom lines L9 and L10, L11 and L12, and L13 and L14, some of which may be identical with the primary lines.

Figure 2:
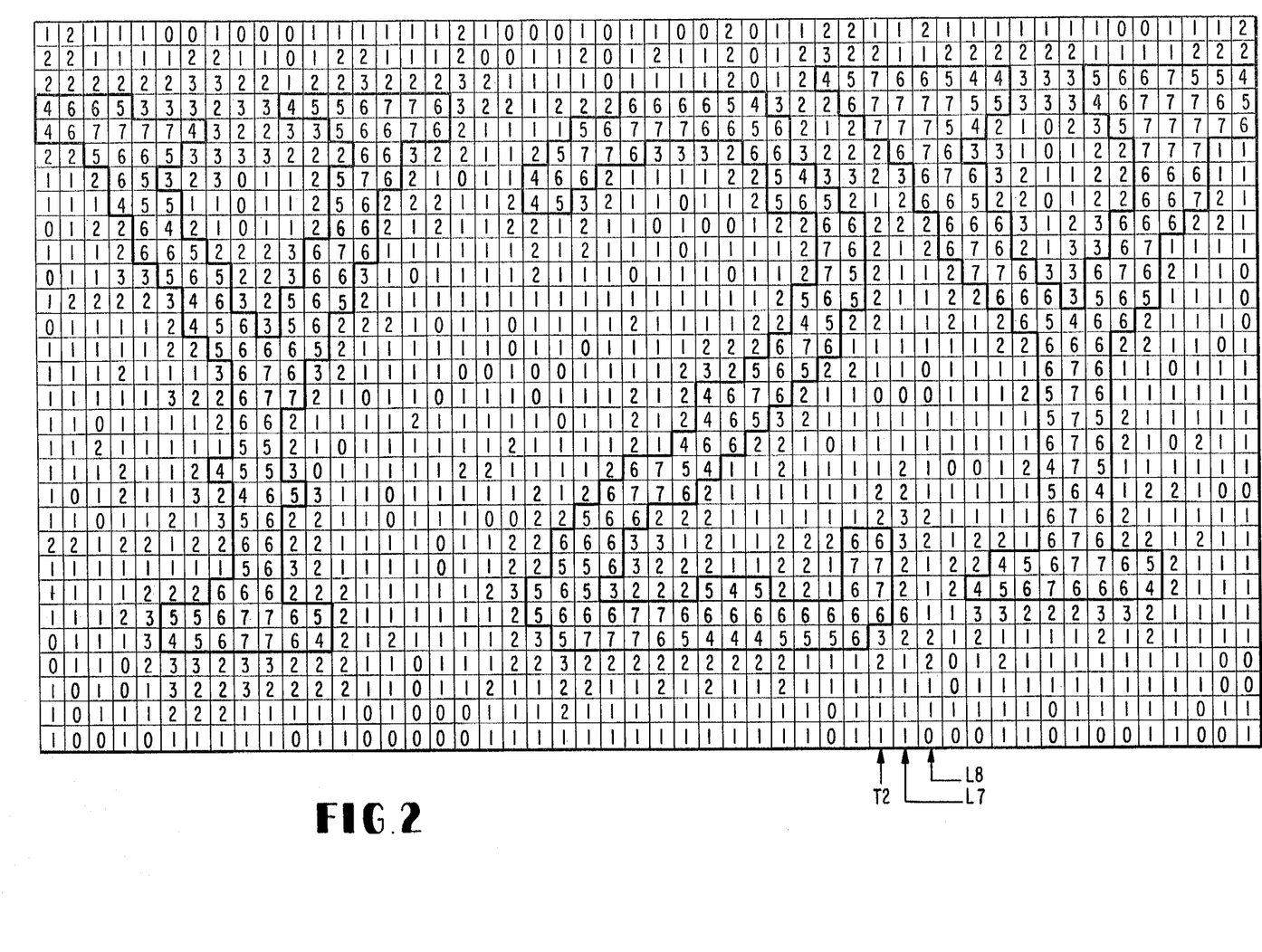
FIG. 2 shows a group of the same letters with a touching letter pair and a multi-level pattern for the frame.

Referring to FIG. 2, a similar letter group includes a touching letter pair, "2" and the following "Y". A multi-level pattern defined in the preamble of the instant specification is also depicted therein by eight quantization levels 0 through 7 inscribed in every elementary area, also mentioned above, of that overall frame for the letter group which may be called a primary frame in contrast to the secondary frames described with reference to FIG. 1.

Figure 3:
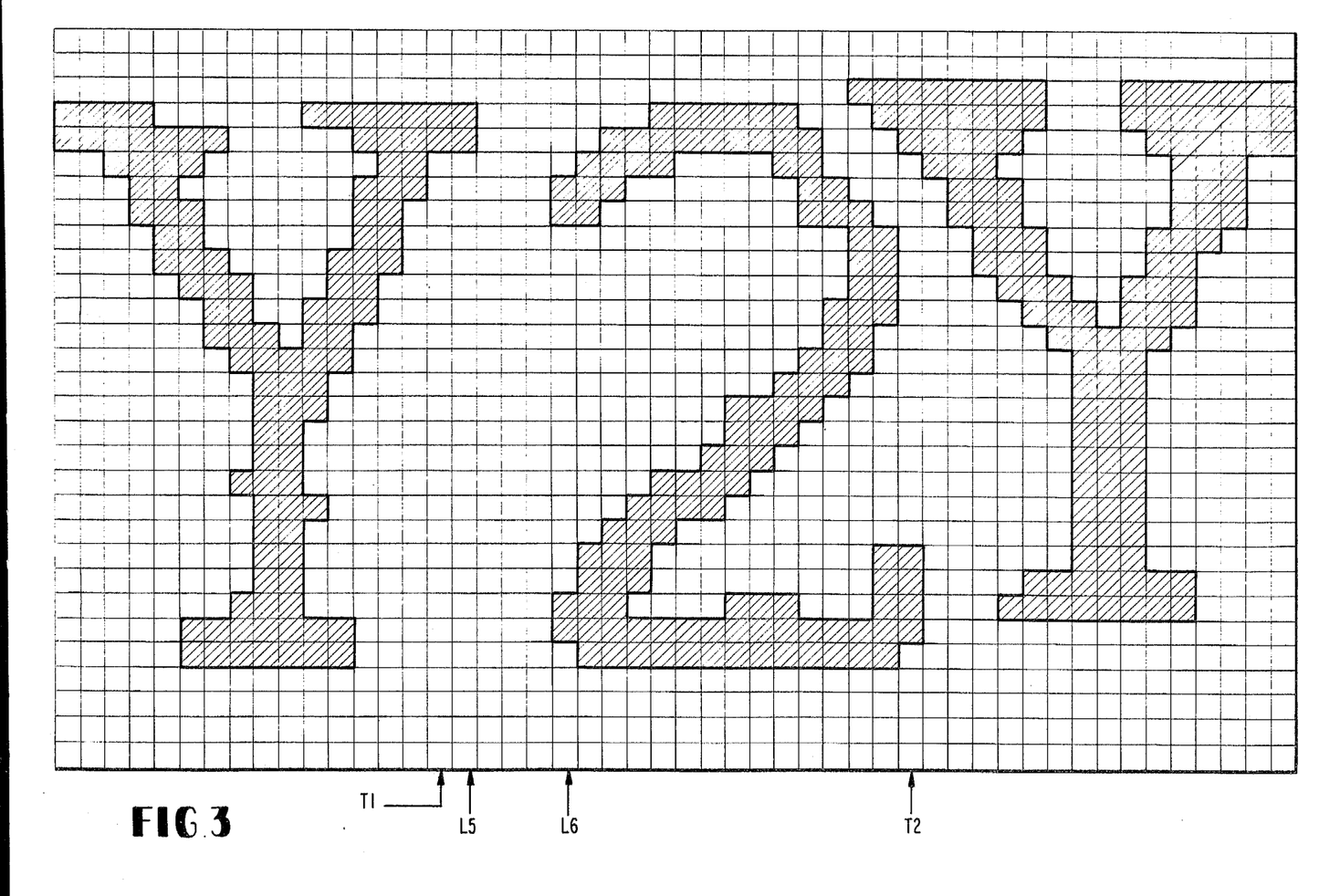
FIG. 3 shows, together with a binary pattern, the group depicted in FIG. 2.

Referring to FIG. 3, the letter group shown in FIG. 2 is reproduced together with a binary pattern for the primary frame. A "black" level, or more correctly, a letter level, is indicated by hatched elementary areas while a "white" or background level, by non-hatched elementary areas. The binary pattern may be obtained from the multi-level pattern with reference to a predetermined slice level, which is set between the multiple quantization steps 3 to 4 in the example being illustrated.

Figure 4:
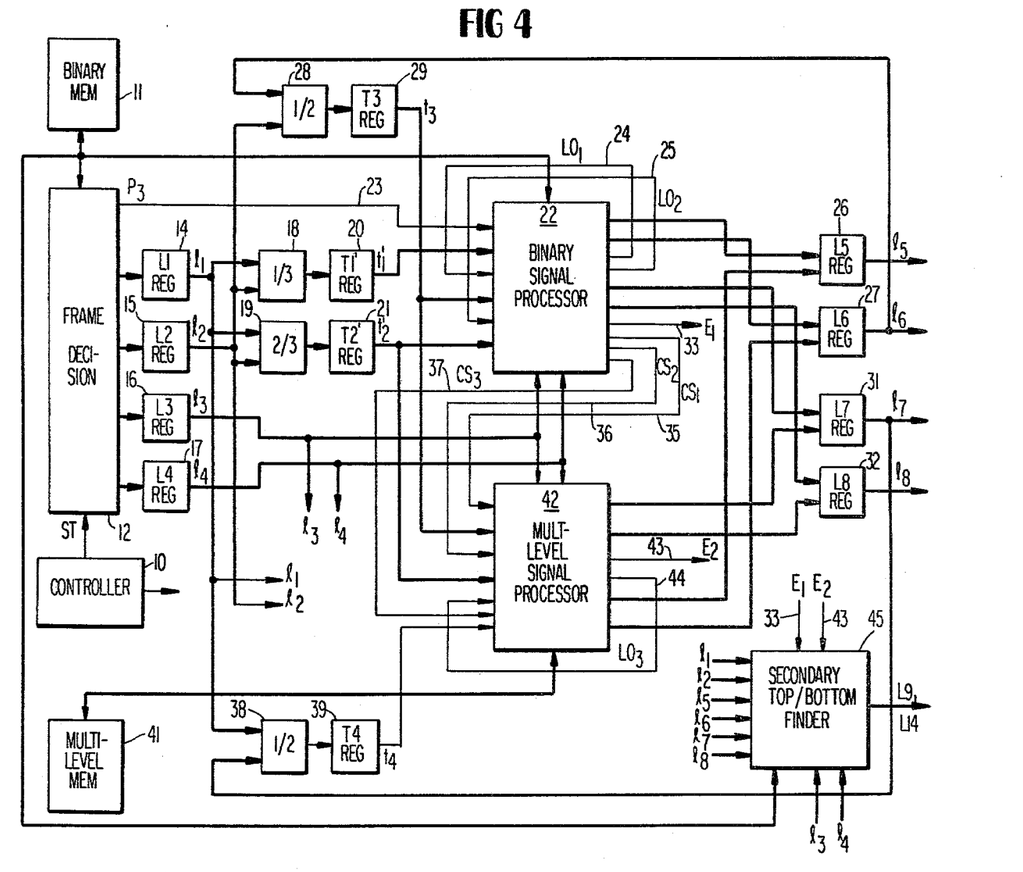
FIG. 4 is a block diagram of an apparatus according to an embodiment of this invention.

Referring now to FIG. 4, a letter segmenting apparatus according to an embodiment of this invention comprises a controller 10 for producing various control signals for controlling operations of various parts of the apparatus, a binary pattern memory 11 for storing therein the binary pattern of the letter group, a frame decision circuit 12 for reading the binary pattern from the memory 11 and producing line signals l1, l2, l3 and l4 representative of the beginning line L1, end line L2, top line L3, and bottom line L4, and L1, L2, L3, and L4 registers 14, 15, 16, and 17 for the line signals l1 through l4. As will readily be understood from the description in the preamble, the line signals l1 through l4 may represent the respective lines L1 through L4 in terms of the number of elementary areas in an X-Y coordinate system, the X and Y axes being in the respective directions of the substantial alignment of letters and perpendicular thereto as shown in FIG. 1.

Figure 5:
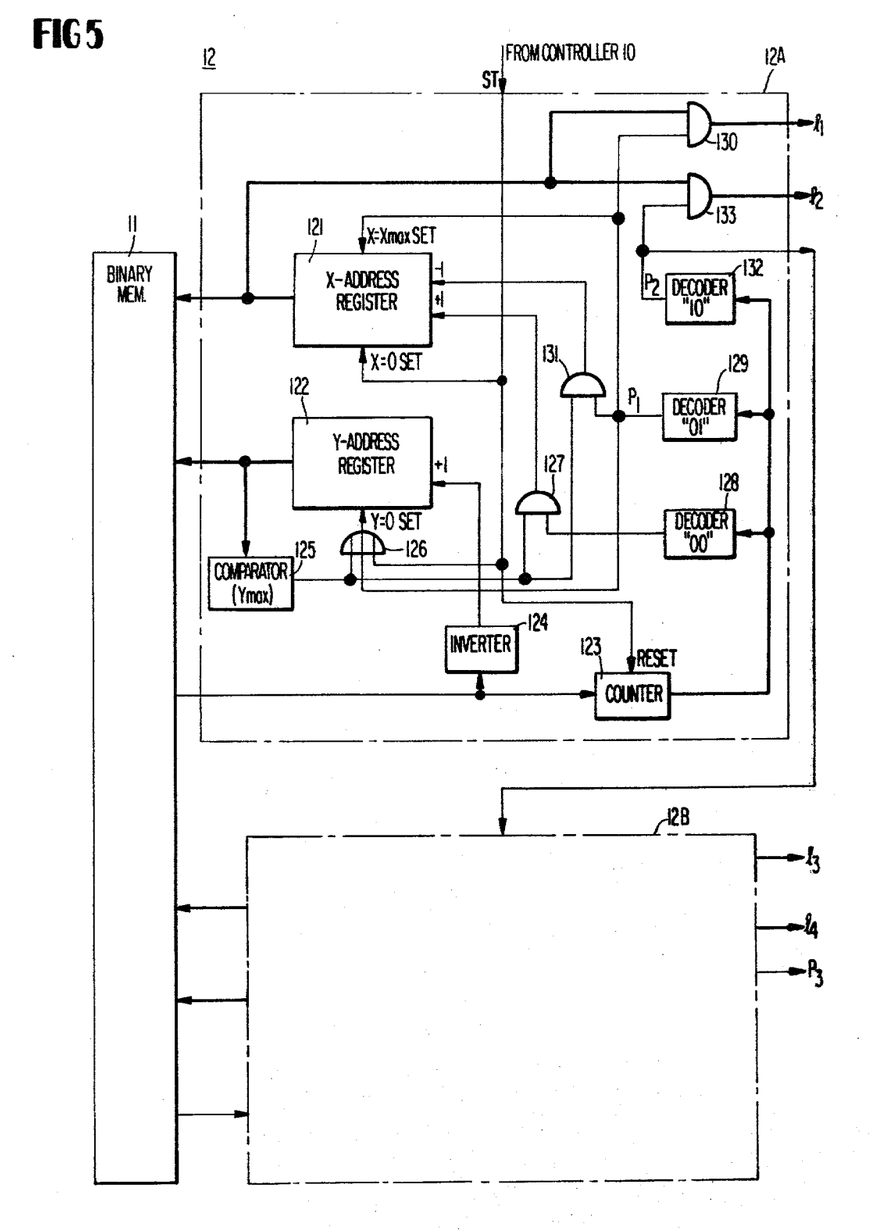
FIG. 5 is a block diagram of a frame decision circuit used in the apparatus illustrated in FIG. 4.

Referring to FIG. 5, the frame decision circuit 12 comprises a first detector 12A for producing the line signals l1 and l2 and a second detector 12B for producing the line signals l3 and l4. A start signal ST is supplied from the controller 10 (FIG. 4) to an X-address register 121, a Y-address register 122 and a counter 123 to reset to X=0, Y=0, and a value "00", respectively. The address registers 121 and 122 supply read-out address data X and Y to the binary pattern memory 11, whereby the stored signal is read out of the address designated by the read-out address data X and Y.

The read out signal is supplied to an inverter 124. When the read out signal is logic "0" representing the "white" or background level, the inverter 124 transfers a pulse to the Y-address register 122 to count up the read out address data Y by 1, whereby the signal stored in the following address is read out. Thus, the signals stored in the addresses having the X-address data X=0 are read out in turn. When the Y-address data Y is counted up to the maximum value Ymax, a comparator 125 generates a pulse, which is supplied through an OR gate 126 to the Y-address register 122 to reset to Y=0, and to an AND gate 127. Because the counter 123 had been reset to the value "00", the output of a decoder 128 for the value "00" is held at logic "1". Therefore, the pulse from the comparator 125 is supplied through the AND gate 127 to the X-address register 121 to count up the address data X by 1.

The above-mentioned process is repeated until the signal of logic "1" representing the "black" or letter level is read out. When the read out sitnal of logic "1" is supplied to the counter 123 to count up by 1, a decoder 129 for the value "01" produces a pulse P1. The pulse P1 is supplied to an AND gate 130 to pass the read out address data X therethrough, whereby the data X at this time is transferred as the line signal l1 to the L1 register 14 (FIG. 4).

The pulse P1 is also supplied to the address registers 121 and 122 to set the read out address data to X=Xmax and Y=0, respectively. Then, there is repeated the process similar to the above-mentioned one for producing the line signal l1 except that the output pulse of the comparator 125 is supplied through an AND gate 131 to the X-address register 121 in order to count down the address data X by 1.

When the read out signal of logic "1" is again obtained, the counter 123 is counted up by 1, whereby a decoder 132 for the value "10" produces a pulse P2. The pulse P2 is supplied to an AND gate 133 to pass the address data X therethrough, whereby the data X at this time is transferred as the line signal l2 to the L2 register 15 (FIG. 4).

The pulse P2 is also supplied as a start pulse to the second detector 12B. Because the second detector 12B is identical to the first detector 12A except that the relationship between the X- and Y-address registers is reversed with each other and there is provided a comparator for comparing the address data X with the maximum value Xmax instead of the comparator 125, the detailed construction and operation are omitted. The second detector 12A produces the line signal l3 first and them the line signal l4 and a pulse P3 representing a completion of the frame decision.

Referring again to FIG. 4, for a letter group consisting possibly of three letters, ⅓ and 2/3 proportioning circuits 18 and 19 are provided for proportioning the frame width given by the line signals 11 and 12 in consideration of the common letter width to provide signals $t'_1$ and $t'_2$ representative of possible locations $T'_1$ and $T'_2$ of dividing lines for the letter group. Here, the possible locations signals $t'_1$ and $t'_2$ are $l_1+(l_2-l_1/3)$ and $l_1+(2(l_2-l_1)/3)$, respectively. The signals $t'_1$ and $t'_2$ are stored in $T1'$ and $T2'$ registers 20 and 21 therefor.

Further referring to FIG. 4, a binary signal processor 22 of a structure later described, responsive to a pulse P3 from the frame decision circuit 12 on a connection 23, deals at first with the binary pattern and the signal $t'_1$ read from the respective memory 11 and register 20 to decide in effect a correct dividing line T1 in a region including the possible location $T1'$ specified by the signal $t'_1$. The processor 22 produces, when it is possible to decide the correct dividing line T1 as in the cases depicted in FIGS. 1 through 3, signals 15 and 16 representative in effect of the dividing line T1 and a local signal LO1 on a first local connection 24 for indicating a success in the decision. More particularly, the processor 22 finds a letter-level signal in several lines (Y direction) of the elementary areas on both sides of the possible location $T1'$ and decides the lines L5 and L6 mentioned in conjunction with FIG. 1. A local signal LO2 is placed on a second local connection 25 when the processor 22 fails to decide the L5 and L6 lines. The signals 15 and 16 representative of the L5 and L6 lines, when produced, are stored in L5 and L6 registers 26 and 27. Responsive to the signal 16 stored in the register 27 therefore, a first portion 28 of a location adjusting circuit calculates a bisector T3 (FIG. 1) between the L2 and L6 lines with reference to the signal 12 stored in the L2 register 15 to produce an improved possible location signal $t3=(=l6+(l2-l6/2))$ representative of the bisector T3, which in the ideal letter group illustrated with reference to FIG. 1 coincides with the second possible location $T2'$. The signal t3 is stored in a T3 register 29. Responsive to the local signal LO1 fed back through the first local connection 24, the processor 22 now reads the binary pattern and signal t3 from the memory 11 and register 29 and delivers signals 17 and 18 representative of the L7 and L8 lines to registers 31 and 32 therefor and an end signal $E_1$ to a first end line 33.

When the letter group includes a letter pair touching each other in the adjacency of the second possible location $T2'$ or of the bisector T3 as exemplified in FIG. 2 or 3, the processor 22 fails to decide the L7 and L8 lines and places a control signal CS1 on a first control connection 35.

When fed back through the second local connection 25 at an earlier stage described above, the local signal LO2 makes the processor 22 read the signal $t'_2$ from the $T2'$ register 21 and find with reference to the binary pattern read from the memory 11 the L7 and L8 lines before decision of the L5 and L6 lines. If again unsuccessful, the processor 22 delivers a control signal CS2 to a second control connection 36. If successful, the processor 22 stores the signals 17 and 18 in the registers 31 and 32 and places a control signal CS3 on a third control connection 37. It should be noted in this connection that the processor 22 has failed to decide the dividing line at the above-mentioned earlier stage even though successful at this later stage. Meanwhile, a second portion 38 of the location adjusting circuit finds a bisector T4 (FIG. 1) between the L7 and L1 lines and stores an improved possible location signal $t4$ $(=l1+(l7-l1/2)$ representative of the bisector T4 in a T4 register 39.

The above operation of the binary signal processor 22 may be summarized to the following four cases:

(1) A case where the dividing lines T1 and T2 are obtainable:

In the first step, the line signals 15 and 16 are obtained and supplied to the registers 26 and 27, and the first local signal LO1 appears on the first local line 24. In the second step, responsive to the first local signal LO1, the processor 22 provides the line signals 17 and 18, and the end signal E1.

(2) A case where only the dividing lines T1 is obtainable:

In the first step, the line signals 15 and 16, and the first local signal LO1 are obtained in the same manner as the case (1). In the second step, the first control signal CS1 is obtained and supplied to the processor 42.

(3) A case where neither the dividing line T1 nor T2 is obtainable:

In the first step, the processor 22 provides with the second local signal LO2. In the second step, responsive to the second local signal LO2, the second control signal CS2 is obtained and supplied to the processor 42.

(4) A case where only the dividing line T2 is obtainable:

In the first step, the processor 22 provides the second local signal LO2. In the second step, the line signals 17 and 18, and the third control signal CS3 are obtained.

The above operation is shown in the following Table 1.

| CASE NO. | 1ST STEP | | 2ND STEP | |
| --- | --- | --- | --- | --- |
| | LINE SIGNAL | LOCAL SIGNAL | LINE SIGNAL | CONTROL SIGNAL |
| (1) | 15,16 | LO$_1$ | 17,18 | E$_1$ |
| (2) | 15,16 | LO$_1$ | — | CS$_1$ |
| (3) | — | LO$_2$ | — | CS$_2$ |
| (4) | — | LO$_2$ | 17,18 | CS$_3$ |

Still further referring to FIG. 4, the apparatus comprises a multi-level pattern memory 41 for storing therein the multi-level pattern of the letter group and a multi-level signal processor 42 of a structure later described, responsive to each of the control signals CS$_1$ through CS$_3$ placed by the binary signal processor 22 on the relevant one of the control connections 35 through 37, for dealing with the multi-level pattern read thereby from the multi-level pattern memory 41.

When the control signal CS$_1$ appears on the first control connection 35, the processor 42 reads the multi-level pattern and the signal T3 from the memory 41 and register 29 and delivers the signals 17 and 18 to the registers 31 and 32 and an end signal E$_2$ to an end line 43.

When the control signal CS$_2$ is supplied to the second control connection 36, the processor 42 reads at first the multi-level pattern and the signal $t2'$ from the memory 41 and register 21, delivers the signals 17 and 18 to the registers 31 and 32, and places a local signal LO$_3$ on a third local connection 44. Responsive to the signal 17 stored in the L7 register 31, the location adjusting circuit second portion 38 stores a signal t$_4$ in the register 39. Responsive to the local signal LO$_3$ fed back through the third local connection 44, the processor 42 now reads the multi-level pattern and the signal t$_4$ from the memory 41 and register 39, delivers the signals 15 and 16 to the registers 26 and 27, and supplies the end signal E$_2$ to the second end line 43.

When the control signal $CS_3$ is placed on the third control connection 37, the processor 42 operates in the manner when the local signal $LO_3$ is fed back through the third local connection 44.

The operation of the processor 42 may be tabled as shown in the following Table 2.

| CASE | CORRESPONDING CASE NO FOR PROCESSOR 22 | CONTROL SIGNAL FROM 22 | 1ST STEP | | 2ND STEP | |
|---|---|---|---|---|---|---|
| | | | LINE SIGNAL | LOCAL OR END SIGNAL | LINE SIGNAL | END SIGNAL |
| I | (2) | $CS_1$ | 17,18 | $E_2$ | | |
| II | (3) | $CS_2$ | 17,18 | $LO_3$ | 15,16 | $E_2$ |
| III | (4) | $CS_3$ | | | 15,16 | $E_2$ |

The apparatus additionally comprises a secondary top and bottom line finder 45 responsive to the end signal $E_1$ or $E_2$ supplied through either of the end lines 33 and 43 and to the signals $l_1$, $l_2$, and $l_5$ through $l_8$ supplied from the respective registers 14, 15, 26, 27, 31, and 32 and to the binary pattern read from the memory 11 for producing signals $l_9$ through $l_{14}$ representative of the L9 L14 lines illustrated with reference to FIG. 1. Incidentally, the signals $l_3$ and $l_4$ are supplied to the processors 22 and 42 for use in producing the signals $l_5$ through $l_8$, and to the finder 45 for use in producing the signals $l_9$ through $l_{14}$.

Figure 6:
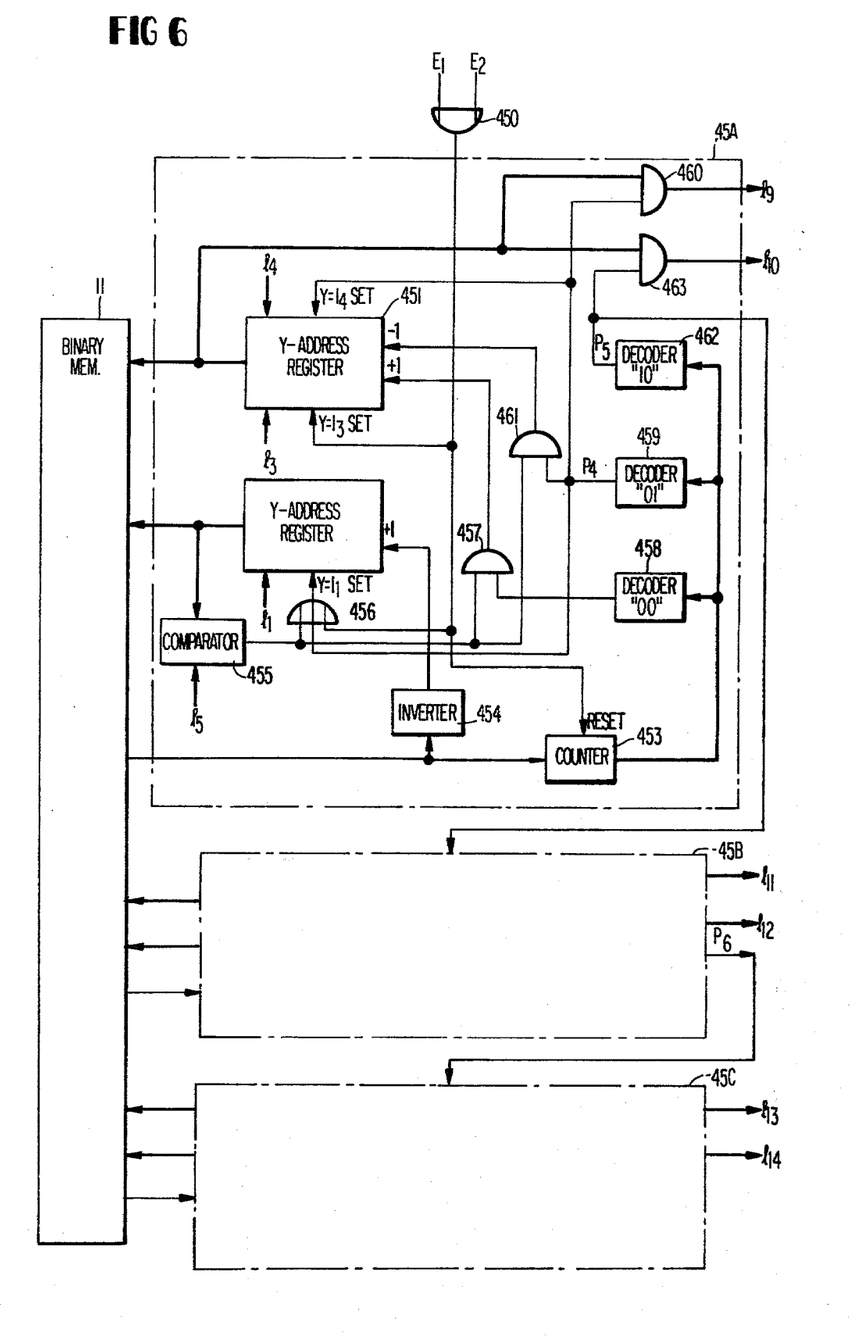
FIG. 6 is a block diagram of a secondary top and bottom line finder 45 used in the apparatus illustrated in FIG. 4.

Referring to FIG. 6, the secondary top and bottom line finder 45 comprises first, second, and third detectors 45A, 45B, and 45C for producing the signals $l_9$ and $l_{10}$, $l_{11}$ and $l_{12}$, and $l_{13}$ and $l_{14}$, respectively. The end signals $E_1$ and $E_2$ are supplied from the processors 22 and 42 (FIG. 4) through an OR gate 450 to the first detector 45A. The first detector 45A comprises a Y-address register 451 and an X-address register 452 which are supplied with the line signals $l_3$ and $l_4$, and the line signal $l_1$, respectively. The end signal $E_1$ or $E_2$ is supplied through the OR gate 450 to the address registers 451 and 452 to reset to $Y=l_3$ and $X=l_1$, respectively. The end signal is also supplied to a counter 453 to reset to a value "00".

The address registers 451 and 452 supply read-out address data Y and X to the binary pattern memory 11, whereby the stored signal is read out of the address designated by the read-out address data Y and X. The read out signal is supplied to an inverter 454. When the read out signal is logic "0", the inverter 454 transfers a pulse to the X-address register 452 to count up the address data X by 1, whereby the signal stored in the following address is read out. Thus, the signals stored in the addresses having the Y-address data $Y=l_3$ are read out in turn from $X=l_1$.

The address data X is also supplied to a comparator 455, which is supplied with the line signal $l_5$ as a reference signal. When the address data X is counted up to the value $l_5$, the comparator 455 generates a pulse, which is supplied through an OR gate 456 to the address register 452 to reset to $X=l_1$. The pulse from the comparator 452 is also supplied to an AND gate 45, which is supplied with an output of a decoder 458 for a value "00". Because the counter 453 had been reset to the value "00", the output of the decoder 458 is held at logic "1". Therefore, the pulse from the comparator 455 is supplied through the AND gate 457 to the address register 451 to count up the address data Y by 1. Thus, every time the address data X is to be equal to $l_5$, the address data Y is counted up by 1 and the address data X is reset to $X=l_1$.

The above-mentioned process is repeated until there is read out the signal of logic "1". When the read out signal of logic "1" is supplied to the counter 453 to count up by 1, a decoder 459 for the value "01" produces a pulse P4. The pulse P1 is supplied to an AND gate 460 to pass the read out address data Y therethrough, whereby the address data Y at a time when the signal of logic "1" is first read out is outputed as the line signal $l_9$.

The pulse P4 is also supplied to the address registers 451 and 452 to set the read out address data to $Y=l_4$ and $X=l_1$, respectively. Then, the process similar to the above-mentioned one is repeated for producing the line signal $l_9$ except that the pulse from the comparator 455 is supplied through an AND gate 461 to the address register 451 in order to count down the address data Y by 1.

When the signal of logic "1" is again read out, the counter 453 is counted up by 1, whereby a decoder 462 for the value "10" produces a pulse P5. The pulse P2 is supplied to an AND gate 463 to pass the address data Y therethrough, whereby the address data Y at a time when the signal of logic "1" is again read out is outputed as the line signal $l_{10}$.

The pulse $P_5$ is also supplied as a start pulse to the second detector 45B. The second detector 45B is identical to the first detector 45A except that the line signals $l_6$ and $l_7$ are used instead of the line signals $l_1$ and $l_5$, respectively and produces the line signals $l_{11}$ and $l_{12}$ and a pulse P6.

The pulse P6 is supplied as a start pulse to the third detector 45C. The third dtector 45C is identical to the first detector 45A except that the line signals $l_8$ and $l_2$ are used instead of the line signals $l_1$ and $l_5$, respectively and produces the line signals $l_{13}$ and $l_{14}$.

As understood from the above, each of the detectors 45A, 45B and 45C is identical to the detector 12B except for the values to which the address registers are reset.

Figure 7:
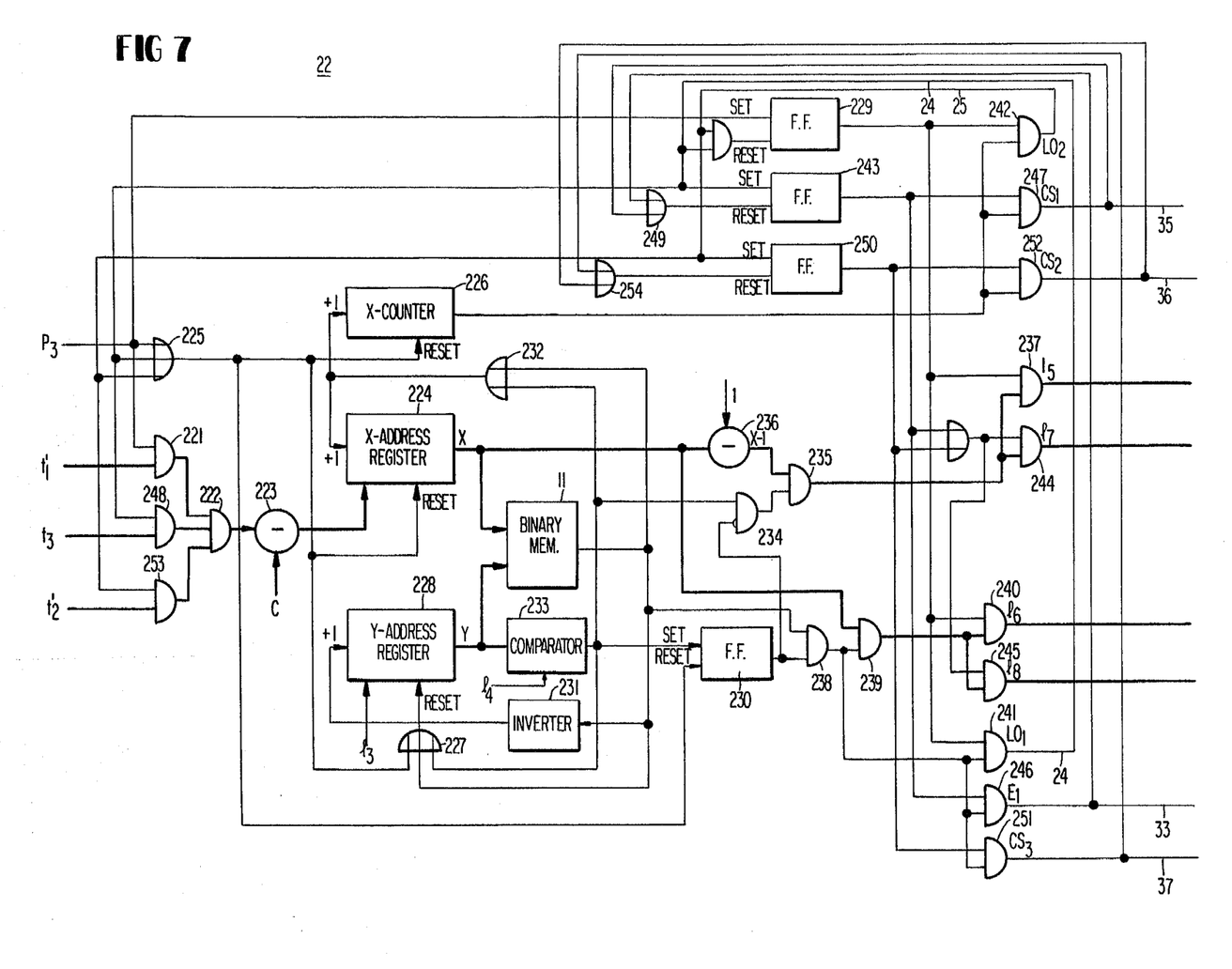
FIG. 7 is a block diagram of a binary signal processor used in the apparatus illustrated in FIG. 4.

Turning to FIG. 7, the binary signal processor 22 starts its operation upon receipt of the pulse P3 from the frame decision circuit 12. When the pulse P3 is supplied to an AND gate 221, the signal t'l from the register 20 (FIG. 4) is passed through the AND gate 221 and an OR gate 222 to a subtractor 223 for subtracting a constant C, for example, five from the number represented by the signal applied thereto. The output signal of the subtractor 223 representing t'l-C is supplied to an X-address register 224 as an initial data. The pulse P3 is also supplied through an OR gate 225 to the X-address register 224 and an X-counter 226 to reset to t'l-C and 0, respectively. The pulse P3 passed through the OR gate 225 is also supplied through an OR gate 227 to a Y-address register 228, which is supplied with the signal $l_3$ as an initial data, whereby the Y-address register 228 is reset to $l_3$. The pulse P3 is further supplied to flip-flop circuits 229 and 230 so that these are set and reset to output signals of logic "1" and "0", respectively.

The address registers 224 and 228 supply read-out address data X and Y to the binary pattern memory 11, whereby the stored signal is read out of the address designated by the read-out address data X and Y. The read out is supplied to an inverter 231. When the read out signal is logic "0", the inverter 231 transfers a pulse to the Y-address register 228 to count up the address data Y by 1, whereby the signal stored in the following address is read out. Thus, the signals stored in the addresses having X-address data X=ti-C are read out in turn from Y=$l_3$.

When the signal of logic "1" is read out, it is supplied through the OR gate 227 to the Y-address register 228 to reset to Y=$l_3$. The read out signal of logic "1" is also supplied through an OR gate 232 to the X-address register 224 and the X-counter 226 to count up each of the X-address data and the count in the X-counter 226 by 1. The binary pattern memory 11 thus successively reads out the binary signals for the subsequent ones of the 2C+1 lines until it occurs that no signal of logic "1" is read out during the whole scan along a certain line.

The address data Y is also supplied to a comparator 233 which is supplied with the signal $l_4$ as a reference signal and compares the address data Y with the signal $l_4$ to produce a pulse when all logic "0" is reached, i.e., when the data Y coincides with the signal $l_4$. The pulse from the comparator 233 is supplied to an inhibit gate 234, an inhibit terminal of which is connected to the output of the flip-flop circuit 230. Because the flip-flop circuit 230 has been reset, the inhibit gate 234 allows the pulse to pass therethrough. The pulse passed through the inhibit gate 234 is supplied to an AND gate 235, which is supplied with the data X-1 from a subtractor 236 for subtracting one from the data X supplied thereto from the X-address register 224. Therefore, when the comparator 233 produces the pulse, the data X-1 is obtained at the output of the AND gate 235 and supplied to an AND gate 237, another input of which is connected to the output of the flip-flop circuit 229. Because the output of the flip-flop circuit 229 has been set to logic "1", the data X-1 applied to the AND gate 237 is passed therethrough. Thus, the data X-1, when all logic "0" line is reached, is outputed as the signal $l_5$.

Then, the pulse from the comparator 233 counts up the address data X of the X-address register 224 and the count of the X-counter 226 by 1, and resets the Y-address register 228 to Y=$l_3$. The pulse also sets the flip-flop circuit 230, whereby the inhibit gate 234 inhibits the passage of the pulse and alternatively an AND gate 238 allows the passage of the read out signal from the binary pattern memory 11.

When the signal of logic "1" is again read out, the logic "1" signal is supplied through the AND gate 238 to an AND gate 239 which is supplied with the address data X and the X-address register 224. The data X passed through the AND gate 239 is supplied to an AND gate 240, which is supplied with the logic "1" pulse from the flip-flop circuit 229. Thus, the data X, when the logic "1" signal is again read out of the binary pattern memory 11, is outputed from the AND gate 240 as the signal $l_6$.

The logic "1" signal passed through the AND gate 238 is also supplied to an AND gate 241, which is supplied with the logic "1" pulse from the flip-flop circuit 229. Thus, there is obtained on the line 24 the local signal LO1 representing that the binary signal processor 22 has succeeded in the decision of the signals $l_5$ and $l_6$ in the first step. The local signal LO1 is then used as the start signal for the processing in the second step in which the signal $t_3$ from register 29 is used as the reference signal for deciding the signals $l_7$ and $l_8$.

On the other hand, if the comparator 233 does not produce the pulse during the whole scan along the (2C+1) lines $t'_1-C$ to $t'_1+C$, i.e., the X-counter 226 counts up to 2C+1, a pulse of logic "1" is supplied to an AND gate 242, which is supplied with the logic "1" pulse from the flip-flop circuit 229. Thus, there is obtained on the line 25 the local signal LO2 representing that the binary signal processor 22 has failed in the decision of the signals $l_5$ and $l_6$. The local signal LO2 then used as the start signal for the processing in the second step in which the signal $t'_2$ from the register 21 is used as the reference signal.

In case where the binary signal processor 22 has succeeded in the decision of the signals $l_5$ and $l_6$, the local signal LO1 on the line 24 is supplied through an OR gate 243 to the flip-flop circuit 229 to reset, whereby the AND gates 237, 240, 241 and 241 are closed. The local signal LO1 is also supplied directly to a flip-flop circuit 243 to set whereby AND gates 244, 245, 246, and 247 are opened. Further, the local signal $LO_1$ is supplied through the OR gate 225 to the flip-flop circuit 230, whereby the inhibit gate 234 is opened and the AND gate 238 is closed. The local signal LO1 opens an AND gate 248 to pass the signal $t_3$ from the register 29 (FIG. 4) therethrough. Therefore, the data $t_3-C$ is supplied from the subtractor 223 to the X-address register 225 as the initial data. The address registers 224 and 228, and the X-counter 226 are reset by the local signal LO1 passed through the OR gate 225 to X=$t_3-C$, Y=$l_3$, and O, respectively.

The process similar to that in the first step is achieved from X=$t_3-C$. When the all logic "0" line is reached, the comparator 233 produces the pulse, which is then supplied through the inhibit gate 234 to the AND gate 235, and the data X−1 supplied to the AND gate 235 is passed through the AND gates 235 and 244 to output as the signal $l_7$. The pulse from the comparator 233 sets the flip-flop circuit 230, whereby the inhibit gate 234 is inhibited and the AND gate 238 is opened.

Then, the logic "1" signal read out of the binary pattern memory 11 is supplied through the AND gate 238 to the AND gate 239, whereby the data X is passed through the AND gates 239 and 245 to output as the signal $l_8$. The pulse from the AND gate 238 is passed through the AND gate 246 to output as the end signal E1.

If the binary signal processor 22 fails to decide the signal $l_7$ and $l_8$, the X-counter produces the pulse, which is then passed through the AND gate 247 to output on the line 35 as the control signal CS1. Each of the end signal E1 and the control signal $CS_1$ is passed through an OR gate 249 and resets the flip-flop circuit 243.

In case where the binary signal processor 22 has failed to decide the signals $l_5$ and $l_6$ in the first step, the local signal LO2 on the line 25 resets the flip-flop circuit 243 and sets a flip-flop circuit 250, whereby the AND gates 237, 240, 241, and 242 are closed and the AND gates 244, 245, 251, and 252 are opened. Further, the local signal LO2 opens an AND gate 253 to pass the signal $t'_2$ from the register 21 (FIG. 4) therethrough. Therefore, the data $t'_2-C$ supplied from the subtractor 223 to the X-address register 224 as the initial data. Then, the process similar to that in the above-mentioned second step is achieved from X=t′2−C. Thus, there is obtained the control signal $CS_3$ on the line 37 when the signals $l_7$ and $l_8$ are obtained, and the control signal $CS_2$ on the line 36 when not obtained. Each of the control signals $CS_2$ and $CS_3$ is supplied through an OR gate 254 to the flip-flop circuit 250 to reset.

In FIGS. 5, 6, and 7, plural sets of X- and Y-address registers are employed for the binary pattern memory 11. These sets of registers are separately operated in time domain. Therefore, it is noted that only one set of registers may be employed.

Figure 8:
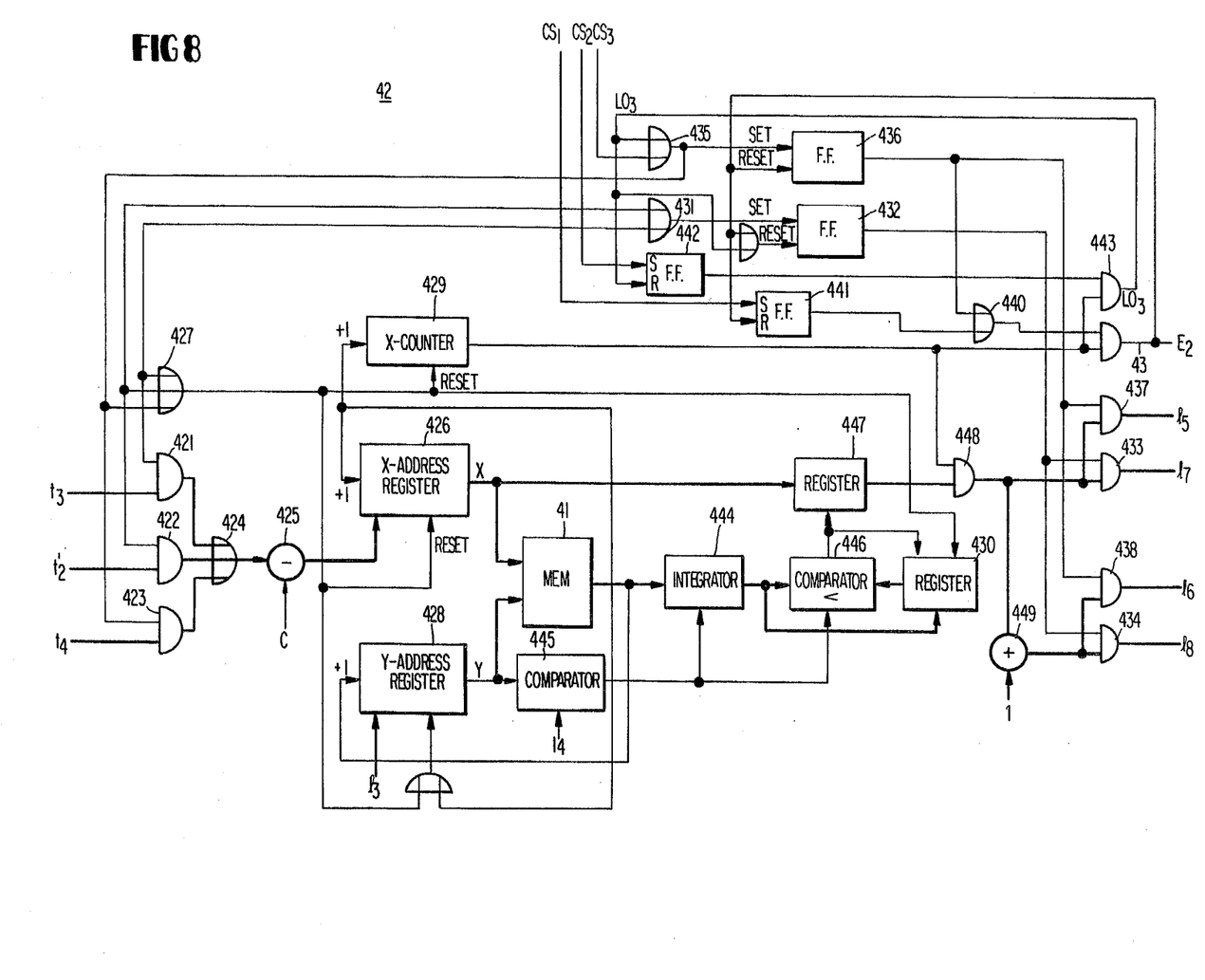
FIG. 8 is a block diagram of a multi-level signal processor used in the apparatus shown in FIG. 4.

Referring finally to FIG. 8, the multi-level signal processor 42 starts its operation upon receipt of the control signal $CS_1$, $CS_2$, or $CS_2$ from the binary signal processor 22. The control signals $CS_1$, $CS_2$, and $CS_3$ are supplied to AND gates 421, 422, and 423 which are supplied with the signals t3, t′2, and t4, respectively. The signal t3, t2′, or t4 is supplied, in response to the control signal CS1, CS2, or CS3, through an OR gate 424 to subtractor 425 for subtracting the constant C from the number represented by the signal applied thereto. The output signal of the subtractor 425 representing t3−C, t′2−C, or t4−C is supplied to an X-address register 426 as the initial data. The control signal is also supplied through an OR gate 427 to the X-address register 426, and a Y-address register 428 to reset to the initial data (t3−C, t2′−C or t4−C) and $Y=l_3$, respectively. The control signal is further supplied through the OR gate 427 to an X-counter 429 and a register 430 to reset to 0 and the maximum value, respectively.

Further, in case where the control signal CS1 or CS2 is supplied through an OR gate 431 to a flip-flop circuit 432, AND gates 433 and 434 are opened. In case where the control signal CS3 is supplied through an OR gate 435 to a flip-flop circuit 436, AND gates 437 and 438 are opened, and an AND gate 439 is opened by the output pulse of the flip-flop circuit 436 after the passage through an OR gate 440. Further, in case where the control signal $CS_1$ is supplied to a flip-flop circuit 441, the AND gate 439 is opened. When the control signal $CS_2$ is supplied to a flip-flop circuit 442, and AND gate 443 is opened.

The address registers 426 and 428 supply the address data X and Y to the multi-level pattern memory 41. The memory 41 produces a three-bit signal representative of the shade or the like at an elementary area corresponding to each address specified by the address data X and Y. The three-bit signal is supplied to an integrator 444 for summing up the levels 0 through 7 represented by the successively produced three-bit signals and adds one to the address data Y. When the address data Y becomes equal to the number represented by the signal $l_4$, a comparator 445 produces a pulse, which is supplied to a comparator 446 for comparing the content in the integrator 444 with that in the register 430 every time the pulse is applied from the comparator 445. When the content of the integrator 444 is less than that in the register 430, the comparator 446 transfers a pulse to registers 430 and 447, whereby the content in the integrator 444 and the address data X in the address register 426 are transferred to and registered therein, respectively. Then, the pulse from the comparator 445 adds one to each of the address data X and the content in the X-counter 429 and resets the Y-address register 428 to $l_3$. This process is achieved repeatedly until the X-counter 429 counts up to 2C+1. When the content in the X-counter 429 becomes equal to 2C+1, a pulse is supplied to an AND gate 448, whereby the data X registered in the register 447 is passed through the AND gate 448 and then supplied to the AND gates 433 and 437. In case where the control signal CS1 or CS2 is supplied as the start pulse, the data X passed through the AND gate 448 is passed through the AND gate 433 to output as the signal $l_7$. In case where the control signal CS3 is supplied as the start pulse, the data from the AND gate 448 is passed through the AND gate 437 to output as the signal $l_5$.

The data X passed through the AND gate 448 is also supplied to an adder 449 for adding one to produce the data X−1, which is then supplied to the AND gates 434 and 438. In case where the control signal CS1 or CS2 is supplied as the start pulse, the data X−1 is passed through the AND gate 434 to output as the signal $l_8$. In case where the control signal CS3 is supplied as the start pulse, the data X−1 is passed through the AND gate 438 to output as the signal $l_6$.

The pulse from the X-counter 429 is also supplied to the AND gates 439 and 443. In case where the control signal CS1 or CS3 is supplied as the start pulse, the pulse from the X-counter 429 is passed through the AND gate 439 to output on the line 43 as the end signal E2. The end signal E2 is supplied to the flip-flop circuits 432, 436 and 441 to reset.

In case where the control signal $CS_2$ is also supplied as the start pulse, the pulse is passed through the AND gate 443 to obtain the local signal LO3. The local signal LO3 is then supplied as one of the start pulse. The process of the multi-level signal processor 42 when the local signal LO3 is supplied thereto is identical to that when the control signal CS3 is supplied. The local signal LO3 is also supplied to the flip-flop circuits 432 and 442 to reset.

While a preferred embodiment and several modifications thereof have thus far been described, it will readily be understood that this invention is applicable to segmenting more-than-three-letter groups. It is also obvious that the elementary areas may not necessarily be given by orthogonally crossing straight lines depicted in either of FIGS. 2 and 3 and that the letters may be vertically aligned as in the Japanese traditional printing, in which case the top and bottom lines should be read as the left and right lines. On segmenting a more-than-three-letter group, either a next but one possible location should be substituted for the end or beginning line or a new set of possible locations should be proportioned for the remaining frame width between the presently decided correct dividing line and the end or beginning line by dividing the remaining frame width by the possible number of the remaining letters. When a control signal is placed on the second control connection 36 to represent the fact that the letter pairs on the beginning and end sides of the letter group are touching letter pairs, the multi-level signal processor 42 may deal with the letter group in the ordinal order, from the beginning toward the end line. In either event, the multi-level signal processor 42 may supply a control signal of a second kind back to the binary signal processor 22, in order to raise the speed of operation for a more-than-three-letter group, to make the latter again try for the remaining frame width the feasibility of deciding correct dividing line or lines. Also, the processors 22 and 42 may deal with such a letter group in a mixed order, sometimes in the ordinary order and sometimes in the reversed order.

What is claimed is:

1. An apparatus for segmenting a group of substantially sligned letters of substantially common height and width to produce signals representative of dividing lines for said group, comprising:

a binary pattern memory for storing therein a binary pattern of a frame for said letter group;

a multi-level pattern memory for storing therein a multi-level pattern of said frame;

a frame decision circuit responsive to the binary pattern stored in said binary pattern memory for producing signals representative of a width of said frame;

a proportioning circuit responsive to the frame width signals and a reference signal retained thereby for proportioning said frame width to produce signals representative of possible locations of said dividing lines, said reference signal being representative of said common letter width;

a binary signal processor responsive to the possible location signals and the binary pattern stored in said binary pattern memory for successively deciding correct dividing lines in regions of the respective possible locations until the processor fails to decide a correct dividing line to produce, in each instance, signals representative of the correct dividing line and a control signal representative of whether or not the correct dividing line is decided;

a multi-level signal processor responsive to the control signal representative of failure of said binary signal processor of deciding a correct dividing line, the possible location signals for the last-mentioned dividing line, and the multi-level pattern stored in said multi-level pattern memory for deciding the last-mentioned dividing line to produce signals representative of the last-mentioned dividing line; and a location adjusting circuit successively responsive to the correct dividing line signals produced by at least one of said binary and multi-level signal processors and responsive to the frame width signals for adjusting the possible location signals so as to improve the possible location represented thereby.

2. An apparatus as claimed in claim 1, said multi-level pattern consisting of multi-level signals representative of quantized degrees of a physical quantity at elementary areas in said frame, said elementary areas being arranged along consecutive elementary lines extending transversely of the alignment of said letters, wherein said multi-level signal processor comprisings:

means for designating a predetermined number of the elementary lines in each of the possible location regions, the designated elementary lines being consecutive to one another;

means for integrating the degrees represented by the multi-level signals for each of said designated elementary lines to produce a signal representative of the integrated degrees; and means for finding the integrated degree signal representative of the minimum integrated degree, to produce said signals produced by the multi-level signal processor.

* * * * *

UNITED STATES PATENT AND TRADEMARK OFFICE
CERTIFICATE OF CORRECTION

Page 1 of 4

PATENT NO. : 4,206,442
DATED : June 3, 1980
INVENTOR(S) : Toshio MIYAZAKI et al.

It is certified that error appears in the above—identified patent and that said Letters Patent is hereby corrected as shown below:

Column 3, line 53, after "3" delete "to" and insert -- and -- ;

line 61, delete "ℓ1, ℓ2, ℓ3 and" and insert -- $\ell_1$, $\ell_2$, $\ell_3$ and -- ;

line 62, delete "ℓ4" and insert -- $\ell_4$ -- ;

line 65, delete "ℓ4" and insert -- $\ell_4$ -- ;

line 66, delete "ℓ1 through ℓ4" and insert -- $\ell_1$ through $\ell_4$ -- ;

Column 4, line 6, delete "ℓ1 and ℓ2" and insert -- $\ell_1$ and $\ell_2$ -- ;

line 7, delete "ℓ3 and ℓ4" and insert -- $\ell_3$ and $\ell_4$ -- ;

line 39, delete "ℓ1" and insert -- $\ell_1$ -- ;

line 45, delete "ℓ1" and insert -- $\ell_1$ -- ;

line 54, delete "ℓ2" and insert -- $\ell_2$ -- ;

line 64, delete "ℓ3" and insert -- $\ell_3$ -- ;

line 65, delete "ℓ4" and insert -- $\ell_4$ -- .

Column 5, line 2, delete "ℓ1 and ℓ2" and insert -- $\ell_1$ and $\ell_2$ -- ;

line 6, delete "ℓ1 + (2 - ℓ1/3)" and insert -- $\ell_1 + (\ell_2 - \ell_1)/3$ -- ;

line 7, delete "ℓ1 + (2(ℓ2 - ℓ1)/3)" and insert --

$\ell_1 + (2(\ell_2 - \ell_1))/3$ -- ;

UNITED STATES PATENT AND TRADEMARK OFFICE
CERTIFICATE OF CORRECTION

PATENT NO. : 4,206,442
DATED : June 3, 1980
INVENTOR(S) : Toshio MIYAZAKI et al.

It is certified that error appears in the above—identified patent and that said Letters Patent is hereby corrected as shown below:

Column 5, line 28, delete "$\ell 5$ and $\ell 6$" and insert -- $\ell_5$ and $\ell_6$ -- ;

line 30, delete "$\ell 6$" and insert -- $\ell_6$ -- ;

line 33, delete "$\ell 2$" and insert -- $\ell_2$ -- ;

line 35, delete "t3 = (= $\ell 6+(\ell 2-\ell 6/2)$)" and insert --

$t_3 = \ell_6+(\ell_2-\ell_6)/2$ -- ;

line 42, delete "$\ell 7$ and $\ell 8$" and insert -- $\ell_7$ and $\ell_8$ --;

line 59, delete "$\ell 7$ and $\ell 8$" and insert -- $\ell_7$ and $\ell_8$ --;

line 67, delete "t4(=$\ell 1+(\ell 7-\ell 1/2)$" and insert --

$t_4=\ell_1+(\ell_7-\ell_1)/2$ -- .

Column 6, line 5, delete "$\ell 5$ and $\ell 6$" and insert -- $\ell_5$ and $\ell_6$ -- ;

line 9, delete "$\ell 7$ and $\ell 8$" and insert -- $\ell_7$ and $\ell_8$ -- ;

line 13, delete "$\ell 5$ and $\ell 6$" and insert -- $\ell_5$ and $\ell_6$ -- ;

line 27, delete "$\ell 7$" and insert -- $\ell_7$ -- ;

line 28, delete "$\ell 8$" and insert -- $\ell_8$ -- ;

line 31, insert -- TABLE 1 -- ;

line 35, delete "$\ell 5$, $\ell 6$    $\ell 7$, $\ell 8$" and insert --

$\ell_5$, $\ell_6$    $\ell_7$, $\ell_8$ -- ;

UNITED STATES PATENT AND TRADEMARK OFFICE
CERTIFICATE OF CORRECTION

PATENT NO. : 4,206,442
DATED : June 3, 1980
INVENTOR(S) : Toshio MIYAZAKI et al.

It is certified that error appears in the above—identified patent and that said Letters Patent is hereby corrected as shown below:

Column 6, line 37, delete "$l5, l6$" and insert -- $l_5, l_6$ -- ;

line 39, delete "$l7, l8$" and insert -- $l_7, l_8$ -- ;

line 53, delete "$l7$ and $l8$" and insert -- $l_7$ and $l_8$ -- ;

line 58, delete "$l7$ and $l8$" and insert -- $l_7$ and $l_8$ -- ;

line 61, delete "$l7$" and insert -- $l_7$ -- ;

line 66, delete "$l5$ and $l6$" and insert -- $l_5$ and $l_6$ -- .

Column 7, line 8, insert -- TABLE 2 -- line 14, delete "$l7, l8$" and insert -- $l_7, l_8$ -- ;

line 15, delete "$l7, l8$" and insert -- $l_7, l_8$ -- ;

line 15, delete "$l5, l6$" and insert -- $l_5, l_6$ -- ;

line 16, delete "$l5, l6$" and insert -- $l_5, l_6$ -- .

Column 9, line 27, after "0" and before "is" insert -- line -- ;

line 57, delete "and" and insert -- from -- .

Column 10, line 22, delete "241" (second occurrence) and insert -- 242 -- ;

line 32, delete "225" and insert -- 224 -- .

Column 11, line 14, delete "$CS_2$" (second occurrence) and insert -- $CS_3$ -- .

UNITED STATES PATENT AND TRADEMARK OFFICE
CERTIFICATE OF CORRECTION

PATENT NO. : 4,206,442

DATED : June 3, 1980

INVENTOR(S) : Toshio MIYAZAKI et al.

It is certified that error appears in the above—identified patent and that said Letters Patent is hereby corrected as shown below:

Column 13, line 2, delete "sligned" and insert -- aligned -- .

Column 14, line 18, delete "comprising" and insert -- comprises -- .

Signed and Sealed this

Second Day of December 1980

[SEAL]

Attest:

Attesting Officer

SIDNEY A. DIAMOND

Commissioner of Patents and Trademarks